United States Patent
Zhu

(10) Patent No.: US 9,886,924 B2
(45) Date of Patent: Feb. 6, 2018

(54) LIQUID CRYSTAL DISPLAY PANEL, LIQUID CRYSTAL DISPLAY DEVICE, AND PIXEL ARRAY

(71) Applicant: SHENZHEN CHINA STAR OPTOELECTRONICS TECHNOLOGY CO., LTD., Shenzhen, Guangdong (CN)

(72) Inventor: Jiang Zhu, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 102 days.

(21) Appl. No.: 14/906,396

(22) PCT Filed: Dec. 31, 2015

(86) PCT No.: PCT/CN2015/100241
§ 371 (c)(1),
(2) Date: Jan. 20, 2016

(87) PCT Pub. No.: WO2017/092143
PCT Pub. Date: Jun. 8, 2017

(65) Prior Publication Data
US 2017/0236477 A1    Aug. 17, 2017

(30) Foreign Application Priority Data
Dec. 3, 2015    (CN) .......................... 2015 1 0885679

(51) Int. Cl.
*G09G 3/36* (2006.01)
*G09G 3/20* (2006.01)
*G02F 1/1362* (2006.01)

(52) U.S. Cl.
CPC ..... *G09G 3/3648* (2013.01); *G02F 1/136286* (2013.01); *G09G 3/2003* (2013.01);
(Continued)

(58) Field of Classification Search
CPC ........... G09G 3/3648; G09G 2310/021; G09G 2300/0809; G02F 2001/134345; G02F 2001/136218
See application file for complete search history.

(56) References Cited

U.S. PATENT DOCUMENTS

2002/0044228 A1* 4/2002 Oh ..................... G02F 1/13458
349/40
2003/0151584 A1* 8/2003 Song .................... G09G 3/3607
345/100
(Continued)

*Primary Examiner* — Shaheda Abdin
(74) *Attorney, Agent, or Firm* — Ladas & Parry LLP

(57) ABSTRACT

A pixel array for a liquid crystal display device is provided. The liquid crystal display device includes a plurality of scanning lines and a plurality of data lines. The pixel array includes a plurality of pixels. The plurality of pixels are respectively coupled to the plurality of data lines. The plurality of pixels are arranged in a plurality of pixel row pairs, and each pixel row pair includes two pixel rows. A N-th data line of the plurality of data lines is coupled to the pixels in a first side or a second side of the N-th data line in a M-th pixel row pair of the plurality of pixel row pairs, where N and M are positive integers. Stripes, flickers, and grid issues after applying two pixel rendering (TPR) are thereby solved.

9 Claims, 2 Drawing Sheets

(52) U.S. Cl.
CPC . *G09G 2300/0452* (2013.01); *G09G 2310/08* (2013.01); *G09G 2320/0242* (2013.01)

(56) References Cited

U.S. PATENT DOCUMENTS

2006/0081850 A1* 4/2006 Lee .................. G02F 1/136286
　　　　　　　　　　　　　　　　　　　　　　　257/72
2012/0068916 A1* 3/2012 Tsubata ................ G02F 1/1362
　　　　　　　　　　　　　　　　　　　　　　　345/94

* cited by examiner

LIQUID CRYSTAL DISPLAY PANEL, LIQUID CRYSTAL DISPLAY DEVICE, AND PIXEL ARRAY

BACKGROUND OF THE INVENTION

Field of Invention

The present invention relates to the field of liquid crystal displays, and more particularly to a pixel array for a liquid crystal display device.

Description of Prior Art

LCD have been developed rapidly due to their small sizes, light weights, and low power consumption. However, in order to make the LCD be applied on large screen displaying and to replace the cathode ray tube (CRT) display, the viewing angle characteristic of the LCD should be improved.

The LCD viewing angle problem is resulted from the operating principle of liquid crystal. A liquid crystal molecule is rod-shaped. Different molecule arrangements correspond with different optical anisotropies. The smaller the angle between the incident light and the liquid crystal molecule is, the smaller the bi-refraction is; on the contrary, the larger the angle between the incident light and the liquid crystal molecule is, the greater the bi-refraction is. The angles between light rays entering a liquid crystal cell at different deviation angles from the normal direction of the display screen and the orientation of the liquid crystal molecules are different. As a result, effective optical path differences (OPD) will be different for different viewing angles. Optimum OPD of the liquid crystal cell is designed according to the normal line, which is perpendicular to the liquid crystal cell. For light rays of oblique angular incidence, when the minimum transmittance increases as the angle increases, and the contrast decreases accordingly. A color shift of an image viewed at a large viewing angle is a main drawback of the existing LCD.

In order to reduce the color shift phenomenon, the essence of the multi-domain vertical alignment (MVA) is to improve the color shift phenomenon by forming domains as much as possible. While two different voltages (one high and one low) control different regions of one sub-pixel at the same time, this is an 8-domain improvement technique. While voltages of two levels control two sub-pixels connected with each other, respectively, this is called two pixel rendering (TPR) technique. The TPR technique can achieve a high transparency feature. However, in order to have a finer resolution of the LCD applying the TPR technique, and charge pixel units more fully, special requirements for the arrangement of the LCD pixel units and the inversion manner of the pixel driving voltage are generated.

So there is a need to provide a pixel array used for an LCD device to overcome the problem stated above.

SUMMARY OF THE INVENTION

An objective of the present invention is to provide a pixel array for a liquid crystal display device.

To solve the above problem, the present invention provides a pixel array for a liquid crystal display device is provided. The liquid crystal display device includes a plurality of scanning lines and a plurality of data lines. The pixel array includes a plurality of pixels.

The plurality of pixels are respectively coupled to the plurality of data lines. The plurality of pixels are arranged in a plurality of pixel row pairs, and each pixel row pair includes two pixel rows. A N-th data line of the plurality of data lines is coupled to the pixels in a first side or a second side of the N-th data line in a M-th pixel row pair of the plurality of pixel row pairs. When M is odd, the N-th data line is coupled to the pixels in the first side of the N-th data line in the M-th pixel row pair. When M is even, the N-th data line is coupled to the pixels in the second side of the N-th data line in the M-th pixel row pair, where N and M are positive integers.

In one preferred embodiment, each pixel row of the two pixel rows comprises a plurality of pixel sets, and each the pixel set includes eight pixels. The eight pixels include a first pixel receiving a first pulse signal, a second pixel receiving a second pulse signal, a third pixel receiving the first pulse signal, a fourth pixel receiving the second pulse signal, a fifth pixel receiving the second pulse signal, a sixth pixel receiving the first pulse signal, a seventh pixel receiving the second pulse signal, and an eighth pixel receiving the first pulse signal.

In one preferred embodiment, the first pixel and the fifth pixel are red pixels; the second pixel and the sixth pixel are green pixels; the third pixel and the seventh pixel are blue pixels; and the fourth pixel and the eighth pixel are white pixels.

In one preferred embodiment, the first pulse signal and the second pulse signal are out of phase.

To solve the above problem, the present invention provides a liquid crystal display panel, which includes a pixel array for a liquid crystal display device. The liquid crystal display device includes a plurality of scanning lines and a plurality of data lines. The pixel array includes a plurality of pixels.

A plurality of pixels are respectively coupled to the plurality of data lines. The plurality of pixels are arranged in a plurality of pixel row pairs, and each pixel row pair includes two pixel rows. Each pixel row of the two pixel rows comprises a plurality of pixel sets. Each of the pixel sets includes eight pixels. The eight pixels include a first pixel receiving a first pulse signal, a second pixel receiving a second pulse signal, a third pixel receiving the first pulse signal, a fourth pixel receiving the second pulse signal, a fifth pixel receiving the second pulse signal, a sixth pixel receiving the first pulse signal, a seventh pixel receiving the second pulse signal, and an eighth pixel receiving the first pulse signal. A N-th data line of the plurality of data lines is coupled to the pixels in a first side or a second side of the N-th data line in a M-th pixel row pair of the plurality of pixel row pairs. When M is odd, the N-th data line is coupled to the pixels in the first side of the N-th data line in the M-th pixel row pair. When M is even, the N-th data line is coupled to the pixels in the second side of the N-th data line in the M-th pixel row pair, where N and M are positive integers.

In one preferred embodiment, the first pixel and the fifth pixel are red pixels; the second pixel and the sixth pixel are green pixels; the third pixel and the seventh pixel are blue pixels; and the fourth pixel and the eighth pixel are white pixels.

In one preferred embodiment, the first pulse signal and the second pulse signal are out of phase.

The differences between the conventional art and the present invention are:

1. The channels of the data driving chip output the voltage with the same polarity in a period of a frame, making the pixel units charge more fully and the liquid display panel saves more power;

2, The liquid display panel has a delicate quality and lifelike images after applying the TPR technique;

3. The liquid display panel won't have stripes, flickers, and grid issues after applying the TPR technique.

DETAILED DESCRIPTION OF THE PREFERRED EMBODIMENTS

Descriptions of the following embodiments refer to attached drawings which are utilized to exemplify specific embodiments. Directional terms mentioned in the present invention, such as "top" and "down", "front", "rear", "left", "right", "inside", "outside", "side" and so on are only directions with respect to the attached drawings. Therefore, the used directional terms are utilized to explain and understand the present invention but not to limit the present invention.

Figure 1:
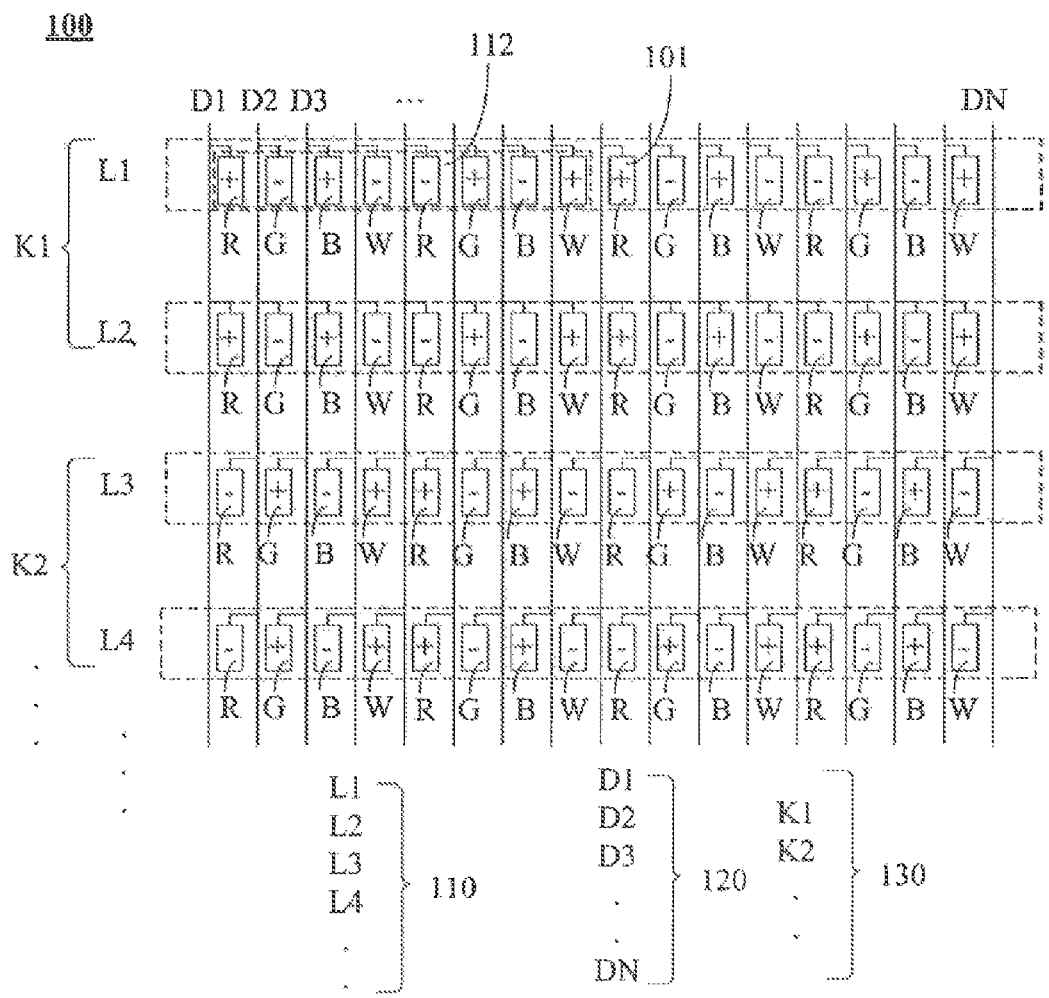
FIG. 1 is a schematic drawing of a pixel array according to the present invention.

FIG. 1 is a schematic drawing of a pixel array according to the present invention. The present invention provides a liquid crystal display panel, which includes a pixel array 100 for a liquid crystal display device. The liquid crystal display device includes a plurality of scanning lines and a plurality of data lines 120 (including D1, D2, D3 ... DN). The pixel array 100 includes a plurality of pixels 101. The plurality of pixels 101 are respectively coupled to the plurality of data lines 120. The plurality of pixels 101 are arranged in a plurality of pixel row pairs 130 (K1-K2 ... ), and each pixel row pair 130 (such as K1) includes two pixel rows 110 (including L1, L2). Each of the pixel rows 110 includes a plurality of pixel sets 112. Each of the pixel sets 112 includes eight pixels.

The eight pixels from left to right respectively are: a first pixel R receiving a first pulse signal (transmitted from the data line D1), a second pixel G receiving a second pulse signal (transmitted from the data line D2), a third pixel B receiving the first pulse signal (transmitted from the data line D3), a fourth pixel W receiving the second pulse signal, a fifth pixel R receiving the second pulse signal, a sixth pixel G receiving the first pulse signal, a seventh B pixel receiving the second pulse signal, and an eighth pixel W receiving the first pulse signal. As the indications, in the preferred embodiment, the first pixel R and the fifth pixel R are red pixels; the second pixel G and the sixth pixel G are green pixels; the third pixel B and the seventh pixel B are blue pixels; and the fourth pixel W and the eighth pixel W are white pixels.

Preferably, the first pulse signal and the second pulse signal are out of phase. That is to say, the pulse signals from left to right received by the eight pixels of each pixel sets 112 are "+−+−−+−+". This manner is a driving mode of "1G1D 2dot crossed pixel" used in a RGBW LCD panel.

A N-th data line DN of the plurality of data lines 120 is coupled to the pixels 101 in a first side or a second side of the N-th data line DN in a M-th pixel row pair of the plurality of pixel row pairs 130. When M is odd, the N-th data line DN is coupled to the pixels 101 in the first side of the N-th data line DN in the M-th pixel row pair. When M is even, the N-th data line DN is coupled to the pixels 101 in the second side of the N-th data line in the M-th pixel row pair, where N and M are positive integers.

For example, when N is equal to 1, the 1st data line D1 is coupled to the pixels 101 in the right side thereof in the pixel rows L1 and L2 of the first pixel row pair K1. However, since there is no pixel in the left side thereof, the 1st data line D1 does not couple to any pixel of the pixel rows L3 and L4 of the second pixel row pair K2. When N is larger than or equal to 2 (using N equal to 3 as an example), the 3rd data line D3 is coupled to the pixels 101 in the right side thereof in the pixel rows L1 and L2 of the first pixel row pair K1. However, the 3rd data line D3 is coupled to the pixels 101 in the right side thereof in the pixel rows L3 and L4 of the second pixel row pair K2.

Figure 2:
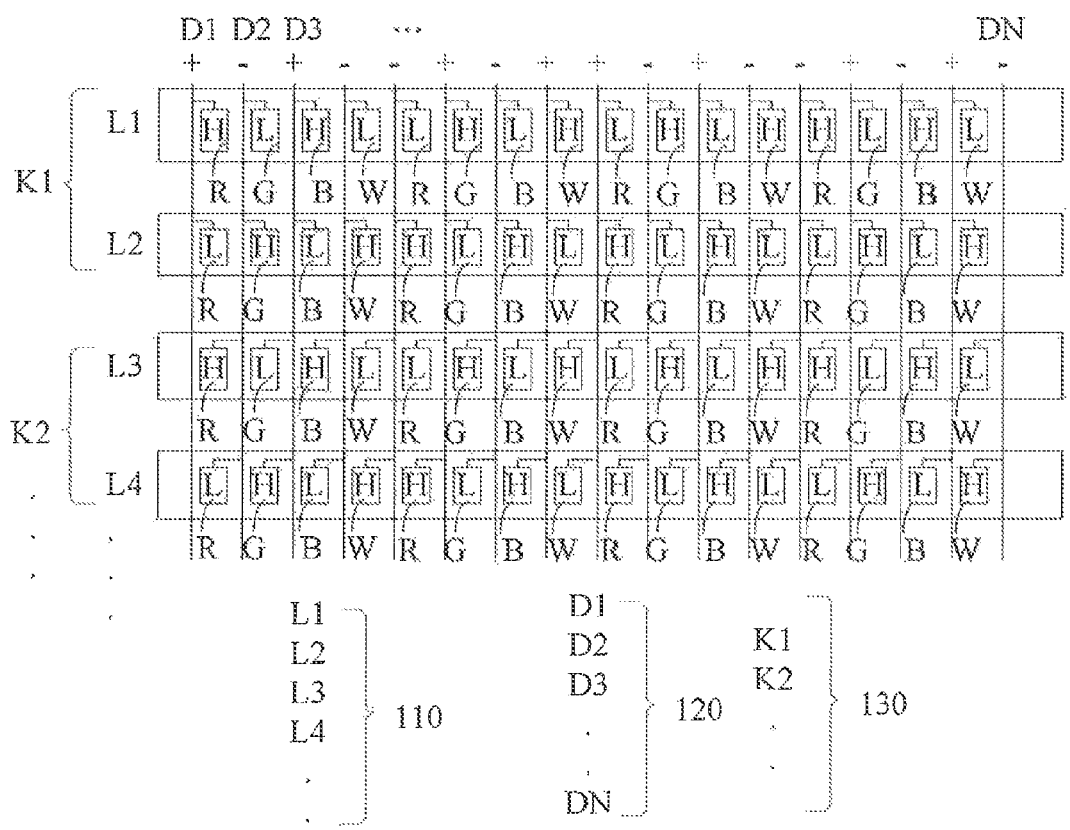
FIG. 2 is a display drawing according to the pixel array of FIG. 1.

FIG. 2 is a display drawing according to the pixel array 100 of FIG. 1. With the first impulse signal and the second impulse signal which are reversed from each other, every two adjacent pixel units of the plurality of pixel units have reversed light/dark states (for example, four dark pixel units surround one light pixel unit). Since the dark/light pixel units are interlaced, the lighting pixels in the same color and in the same pixel column have a positive driving and a negative driving. The LCD panel with RGBW four colors has more delicate qualities, and the pixels are charged more fully.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular firms as illustrated, and that all modifications and alterations which maintain the spirit and realm of the present invention are within the scope as defined in the appended claims.

What is claimed is:

1. A pixel array for a liquid crystal display device, the liquid crystal display device comprising a plurality of scanning lines and a plurality of data lines, wherein the pixel array comprises:
    a plurality of pixels respectively coupled to the plurality of data lines, the plurality of pixels arranged in a plurality of pixel row pairs, each pixel row pair comprising two pixel rows, each pixel row of the two pixel rows comprising a plurality of pixel sets, each the pixel set comprising eight pixels, the eight pixels comprising a first pixel receiving a first pulse signal, a second pixel receiving a second pulse signal, a third pixel receiving the first pulse signal, a fourth pixel receiving the second pulse signal, a fifth pixel receiving the second pulse signal, a sixth pixel receiving the first pulse signal, a seventh pixel receiving the second pulse signal, and an eighth pixel receiving the first pulse signal;
    wherein a N-th data line of the plurality of data lines is coupled to the pixels in a first side or a second side of the N-th data line in a M-th pixel row pair of the plurality of pixel row pairs; when M is odd, the N-th data line is coupled to the pixels in the first side of the N-th data line in the M-th pixel row pair; when M is even, the N-th data line is coupled to the pixels in the second side of the N-th data line in the M-th pixel row pair; wherein N and M are positive integers, and bright/dark states of each two adjacent pixel units are reversed from each other.

2. The pixel array for the liquid crystal display device according to claim 1, wherein the first pixel and the fifth pixel are red pixels; the second pixel and the sixth pixel are green pixels; the third pixel and the seventh pixel are blue pixels; and the fourth pixel and the eighth pixel are white pixels.

3. The pixel array for the liquid crystal display device according to claim 1, wherein the first pulse signal and the second pulse signal are out of phase.

4. A pixel array for a liquid crystal display device, the liquid crystal display device comprising a plurality of scanning lines and a plurality of data lines, wherein the pixel array comprises:

a plurality of pixels respectively coupled to the plurality of data lines, the plurality of pixels arranged in a plurality of pixel row pairs, each pixel row pair comprising two pixel rows, each the pixel set comprising eight pixels, the eight pixels comprising a first pixel receiving a first pulse signal, a second pixel receiving a second pulse signal, a third pixel receiving the first pulse signal, a fourth pixel receiving the second pulse signal, a fifth pixel receiving the second pulse signal, a sixth pixel receiving the first pulse signal, a seventh pixel receiving the second pulse signal, and an eighth pixel receiving the first pulse signal;

wherein a N-th data line of the plurality of data lines is coupled to the pixels in a first side or a second side of the N-th data line in a M-th pixel row pair of the plurality of pixel row pairs; when M is odd, the N-th data line is coupled to the pixels in the first side of the N-th data line in the M-th pixel row pair; when M is even, the N-th data line is coupled to the pixels in the second side of the N-th data line in the M-th pixel row pair;

wherein N and M are positive integers.

5. The pixel array for the liquid crystal display device according to claim 4, wherein the first pixel and the fifth pixel are red pixels; the second pixel and the sixth pixel are green pixels; the third pixel and the seventh pixel are blue pixels; and the fourth pixel and the eighth pixel are white pixels.

6. The pixel array for the liquid crystal display device according to claim 4, wherein the first pulse signal and the second pulse signal are out of phase.

7. A liquid crystal display panel, comprising a pixel array for a liquid crystal display device, the liquid crystal display device comprising a plurality of scanning lines and a plurality of data lines, wherein the pixel array comprises:

a plurality of pixels respectively coupled to the plurality of data lines, the plurality of pixels arranged in a plurality of pixel row pairs, each pixel row pair comprising two pixel rows, each pixel row of the two pixel rows comprising a plurality of pixel sets, each the pixel set comprising eight pixels, the eight pixels comprising a first pixel receiving a first pulse signal, a second pixel receiving a second pulse signal, a third pixel receiving the first pulse signal, a fourth pixel receiving the second pulse signal, a fifth pixel receiving the second pulse signal, a sixth pixel receiving the first pulse signal, a seventh pixel receiving the second pulse signal, and an eighth pixel receiving the first pulse signal; wherein a N-th data line of the plurality of data lines is coupled to the pixels in a first side or a second side of the N-th data line in a M-th pixel row pair of the plurality of pixel row pairs; when M is odd, the N-th data line is coupled to the pixels in the first side of the N-th data line in the M-th pixel row pair; when M is even, the N-th data line is coupled to the pixels in the second side of the N-th data line in the M-th pixel row pair; wherein N and M are positive integers.

8. The liquid crystal display panel according to claim 7, wherein the first pixel and the fifth pixel are red pixels; the second pixel and the sixth pixel are green pixels; the third pixel and the seventh pixel are blue pixels; and the fourth pixel and the eighth pixel are white pixels.

9. The liquid crystal display panel according to claim 7, wherein the first pulse signal and the second pulse signal are out of phase.

* * * * *